United States Patent
Kopaciewicz et al.

(10) Patent No.: US 7,309,458 B2
(45) Date of Patent: *Dec. 18, 2007

(54) MULTI-SIDED IMMERSION FORMATION OF COMPOSITE STRUCTURES AND METHOD

(75) Inventors: William Kopaciewicz, West Newbury, MA (US); Phillip Clark, Wakefield, MA (US); David Brewster, Beverly, MA (US)

(73) Assignee: Millipore Corporation, Billerica, MA (US)

( * ) Notice: Subject to any disclaimer, the term of this patent is extended or adjusted under 35 U.S.C. 154(b) by 372 days.

This patent is subject to a terminal disclaimer.

(21) Appl. No.: 10/689,121

(22) Filed: Oct. 20, 2003

(65) Prior Publication Data

US 2004/0124142 A1    Jul. 1, 2004

Related U.S. Application Data

(60) Provisional application No. 60/420,231, filed on Oct. 22, 2002.

(51) Int. Cl.
*B29C 65/00* (2006.01)

(52) U.S. Cl. .................. 264/41; 422/101; 422/102; 210/321.6; 210/500.22; 210/500.27

(58) Field of Classification Search ............... 422/68.1, 422/100, 101, 102; 436/178, 180; 210/321.6, 210/321.72, 321.84, 321.87, 500.1, 500.21, 210/500.22, 500.27, 502.1; 264/41
See application file for complete search history.

(56) References Cited

U.S. PATENT DOCUMENTS

| | | | | |
|---|---|---|---|---|
| 3,985,032 A | * | 10/1976 | Avakian | 73/863.25 |
| 4,059,020 A | * | 11/1977 | Avakian | 73/863.25 |
| 4,774,058 A | * | 9/1988 | Mehl | 210/266 |
| 4,902,421 A | * | 2/1990 | Pascale et al. | 210/416.1 |
| 4,999,164 A | * | 3/1991 | Puchinger et al. | 422/100 |
| 5,156,811 A | | 10/1992 | White | 422/100 |
| 5,364,595 A | * | 11/1994 | Smith | 422/100 |
| 5,556,598 A | | 9/1996 | Raybuck et al. | 422/10 D |
| 6,048,457 A | | 4/2000 | Kopaciewicz et al. | 210/321.6 |
| 6,200,474 B1 | | 3/2001 | Kopaciewicz et al. | 210/321.6 |
| 6,451,260 B1 | | 9/2002 | Dusterhoft et al. | 422/68.1 |
| 6,537,502 B1 | | 3/2003 | Shukla et al. | 422/101 |
| 6,566,145 B2 | | 5/2003 | Brewer | 436/178 |
| 6,635,201 B1 | * | 10/2003 | Kopaciewicz et al. | 264/41 |
| 6,770,246 B1 | * | 8/2004 | Husek | 422/101 |
| 6,783,672 B2 | * | 8/2004 | Tubbs et al. | 210/198.2 |
| 6,830,717 B2 | * | 12/2004 | Kopaciewicz et al. | 264/41 |
| 6,875,354 B1 | | 4/2005 | Kopaciewicz | 210/321.75 |
| 2003/0190260 A1 | * | 10/2003 | Wheeler et al. | 422/63 |

* cited by examiner

*Primary Examiner*—Jill Warden
*Assistant Examiner*—Dwayne K Handy
(74) *Attorney, Agent, or Firm*—Nields & Lemack

(57) ABSTRACT

Sample preparation device and method for desalting and concentrating samples prior to further analysis such as by MALDI TOF and/or electro-spray ionization (ESI) mass spectrometry. The device in accordance with an embodiment of the present invention contains a three dimensional structure preferably comprising a plurality of sorptive particles entrapped in a porous polymer matrix so as to form a device capable of carrying out solid phase extraction. The device is manufactured by introducing casting solution containing polymer and optionally particles into a housing, and subsequently exposing the device to a quench bath for a time sufficient to allow for solvent exchange and precipitation to form the composite structure in the housing. The present invention is also directed towards a method of sample preparation using the device of the present invention.

11 Claims, 7 Drawing Sheets

SEM of ZipTip cross-section. The particles are nominally 15um in diameter.

Cross-sectional SEM of a structure that has been "double-side quenched." Particles are nominally 15 um in diameter.

MULTI-SIDED IMMERSION FORMATION OF COMPOSITE STRUCTURES AND METHOD

This application claims priority of Provisional Application Ser. No. 60/420,231 filed Oct. 22, 2002, the disclosure of which is hereby incorporated by reference.

BACKGROUND OF THE INVENTION

A number of analytical procedures have been developed in the biochemical art wherein it is required to concentrate and remove low molecular weight ions or solutes from peptide solutions in order to have a relatively pure concentrated peptide sample which can be analyzed effectively. Many other analytical procedures, involving not only peptides but macromolecular species in general, also have been developed wherein it is necessary to concentrate and/or "desalt" a macromolecular component in a liquid sample, as there is commonly a need in biochemistry/medicinal chemistry for relatively pure analytes devoid of salts, detergents and other contaminants. The presence of contaminating substances can be deleterious, in that they often interfere with subsequent chemical or physical analyses. Analogous situations exist in the environmental art and in classical chemical analysis.

Ultrafiltration devices are commonly used for the "purification" and/or sample preparation of biomolecules and natural products. For such a process to be successful, a membrane must be selected that retains the molecules of interest, yet passes the impurities. Although this scenario is relatively straightforward for analytes greater than about 10,000 molecular weight, it becomes increasingly problematic for substances less than about 5000 molecular weight. The reason is due to the fact that the required membrane porosity to retain the 5000 molecular weight analyte is so low that the water permeability (flow rate) becomes poor and processing times too long. For example, a typical centrifugal "spin time" for a device using a membrane suitable for analytes having a molecular weight of 30,000 or more is about one hour, whereas as many as six hours may be required for analytes of about 1000 molecular weight using a suitable membrane. Furthermore, such long-term exposure to high g-forces frequently results in device failure.

Sample processing with vacuum as the driving force offers advantages over centrifugation. Collection of the elution volume by centrifugation of multiwell formats is possible but difficult, since the volume in each well may vary due to rapid evaporation during transfer of the multiwell plate to the centrifuge and especially during centrifugation. Moreover, every time the protein sample is transferred, such as from pipette to collection plate, or is resuspended, sample is lost to due adherence to the interfaces of these devices. Since sample amounts are typically in the femtomole range, sample losses are unacceptable. Furthermore, centrifugation is also not amenable to automation, as the plate must be manually placed and removed into and from the centrifuge.

The sample quantities of protein now common in the art are in the 0.01 to 10 microgram range and smaller. At such low loads, efficient sample handling is crucial to avoid loss. Conventional methods and devices based on ultrafiltration for sample preparation are not practical for handling the "microseparation" of such small sample volumes. However, the application of adsorption technology at this scale could offer a highly effective approach to micro-mass sample preparation.

One conventional method for making sample preparation devices that contain chromatographic media is to first insert a precut porous plug obtained from, for example, a porous plastic frit, or a fiberous glass or cellulose sheet into a well or the tip of a pipette, followed by the addition of loose particles and a second porous plug. The plugs serve to retain the particles in place in the pipette tip or well. However, the plugs also entrap excess liquid thereby creating dead space or volume (i.e., space not occupied by media or polymer that can lead to poor sample recovery, contamination such as by sample carry-over, etc.). The frits also provide an increased surface area that will increase the binding losses. Also, the frits increase the required elution volume thereby reducing the concentration of the eluant sample. This procedure cannot be used with extremely small liquid delivery devices such as pipette tips, as there is no practical way to load either the plug or the particles to obtain a micro-adsorptive device that contains 1 milligram or less of adsorbent to be used for the aforementioned extremely small sample loads.

Alternatively, a micro sample preparation device can be made by lodging media in the bore of a capillary pipette. However, the flow through such devices is typically slow and variable.

Moreover, although from a mass adsorption standpoint, adsorptive powders offer the highest capacity, they are difficult or indeed impossible to handle in milligram quantities. Although polymer-based adsorptive membrane sheets are relatively easy to handle, even this approach has difficulties at extremely small scales. Moreover, the binding capacity of the membrane is poor as a result of relatively low substructure surface area.

Current trends in research are to analyze larger and larger numbers of smaller samples using automated handling equipment or robotics. Quantities of individual samples are from the nano-mole levels to atto-mole levels. As a result, instrumentation is becoming more sensitive and a need exists for sample handling formats to be miniaturized, high density and disposable.

Sample preparation prior to analysis (such as by MALDI TOF mass spectrometry) often involves desalting and concentration of samples (e.g., peptides) down to a 1-2 microliter volume. These volumes are likely to decrease to nanoliter volumes in time. Simultaneous preparation and analysis of multiple samples is often desirable. Multiwell plates have been developed for simultaneous assay, typically consisting of 96, 384 or 1536 reaction vessels or wells per plate.

Certain sample preparation devices, such as the ZipTip® device commercially available from Millipore Corporation, are excellent tools for sample preparation prior to MALDI analysis. They are a single sample processor that can be used to spot sample onto the MALDI target manually or by automated equipment. More specifically, U.S. Pat. Nos. 6,048,457 and 6,200,474 (the disclosures of which are hereby incorporated by reference) teach the formation of cast membrane structures for sample preparation that are formed by phase inversion of a particle loaded polymer system at the housing orifice. The polymer is precipitated when the portion of the housing (containing the soluble polymer/particle lacquer) is immersed in a precipitation bath (typically water). The insertion creates a slight liquid pressure across the lacquer such that the water intrudes upon the polymer creating an open sponge-like structure upon precipitation. However, at the polymer-water interface on the structure there is a semi-permeable membrane film that creates a high resistance to flow. When this barrier is either abraded or cut off, the resulting structure is highly permeable. The resulting device is suitable to allow flow under the low differential pressures generated by a common 10 microliter hand-held pipettor (e.g. Gilson, Pipetman). However, the macroporous structure is less efficient at capturing solutes. As such, often times the sample volume must be passed through the membrane structure multiple times.

It would be desirable to provide a sample preparation device and method that includes a membrane structure that has a more dense structure, better suited for formats such as a vacuum plate, that must capture solutes in a single pass.

It also would be desirable to provide a process for preparing a high-throughput sample preparation device and the device so made.

It is therefore an object of the present invention to provide a sample preparation device that can concentrate, purify and/or desalt molecules from sample solutions.

It is another object of the present invention to provide a sample preparation device that can concentrate, purify and/or desalt molecules and elute in small sample solutions.

It is another object of the present invention to provide a sample preparation device that can concentrate, purify and/or desalt molecules from sample solutions in a variety of form geometries.

It is a still further object of the present invention to provide a sample preparation device that is simple and economic to manufacture.

It is yet a further object of the present invention to provide a method of directly forming membrane structures in a housing spout, wherein both the spout and the reservoir of the housing have narrow geometries.

It is a further object of the present invention to provide a high density membrane that assumes the shape of the housing or portion thereof in which it is cast, and can be retained in that housing by chemical adhesion without the use of porous plugs.

It is a still further object of the present invention to provide a multi-well device wherein various arrays within the array of wells contain a high density of composite membrane having the same or different chemistries.

It is yet a further object of the present invention to provide a single or multi-well device having a high density membrane, with or without adsorptive particles contained therein, that assumes the shape of the housing or a portion thereof in which it is cast and can be retained in that housing without the use of porous plugs.

SUMMARY OF THE INVENTION

The problems of the prior art have been overcome by the present invention, which provides a single-or multi-well sample preparation device, a method for desalting and concentrating samples, such as prior to further analysis by MALDI TOF mass spectrometry, and a method of forming the device. For example, the device in accordance with one embodiment of the present invention includes a plurality of wells each in fluid communication with a respective outlet or drainage opening, containing a three dimensional membrane structure preferably comprising a plurality of sorptive particles entrapped in a porous polymer matrix immobilized within the outlet so as to form a device capable of carrying out solid phase extraction. The present invention is also directed towards a method of forming a sample preparation device, and a method of sample preparation using the device of the present invention.

In its method aspects, the present invention encompasses a method for casting in-place dense composite (filled) and/or non-filled structures that are useful as sorptive or reactive media or for size-based separations. In one embodiment, the structures are monolithic and/or continuous. The invention is applicable to a variety of particular housing sizes and configurations, and provides a means of affixing media in a housing of a variety of volumes and geometries. The invention enables the inclusion of a substantial (relative to the increase in surface area of the precipitated structure) amount of media in the polymer while still retaining a three dimensional polymeric structure. In another embodiment, unfilled structures which may be self-retaining and/or self-supporting are cast in situ in a suitable housing and can be used for size-based separations wherein the cast structure acts as a semi-permeable barrier, or for adsorption. The present invention also encompasses these structures as well as housings containing these structures.

DETAILED DESCRIPTION OF THE INVENTION

The term "membrane" as used herein includes permeable and semi-permeable three-dimensional structures with or without particles, having a porosity suitable for the desired application. The term "composite structure" as used herein includes filled membranes.

The sample preparation device of the present invention is manufactured by introducing the casting solution or lacquer containing polymer and optionally particles into a suitable housing, such as one or more of the wells of a multi-well device, and subsequently exposing the housing to a quench bath for a time sufficient to allow for solvent exchange and precipitation of the solids to form the membrane structures in the housing. The quench bath is a fluid, preferably a liquid. One such preferred structure is a three-dimensional structure comprising a plurality of sorptive particles entrapped in a porous polymer matrix and having an aspect ratio (average diameter to average thickness) of less than about 20, more preferably less than about 10, preferably less than about 5, especially less than about 1.

Figure 1:
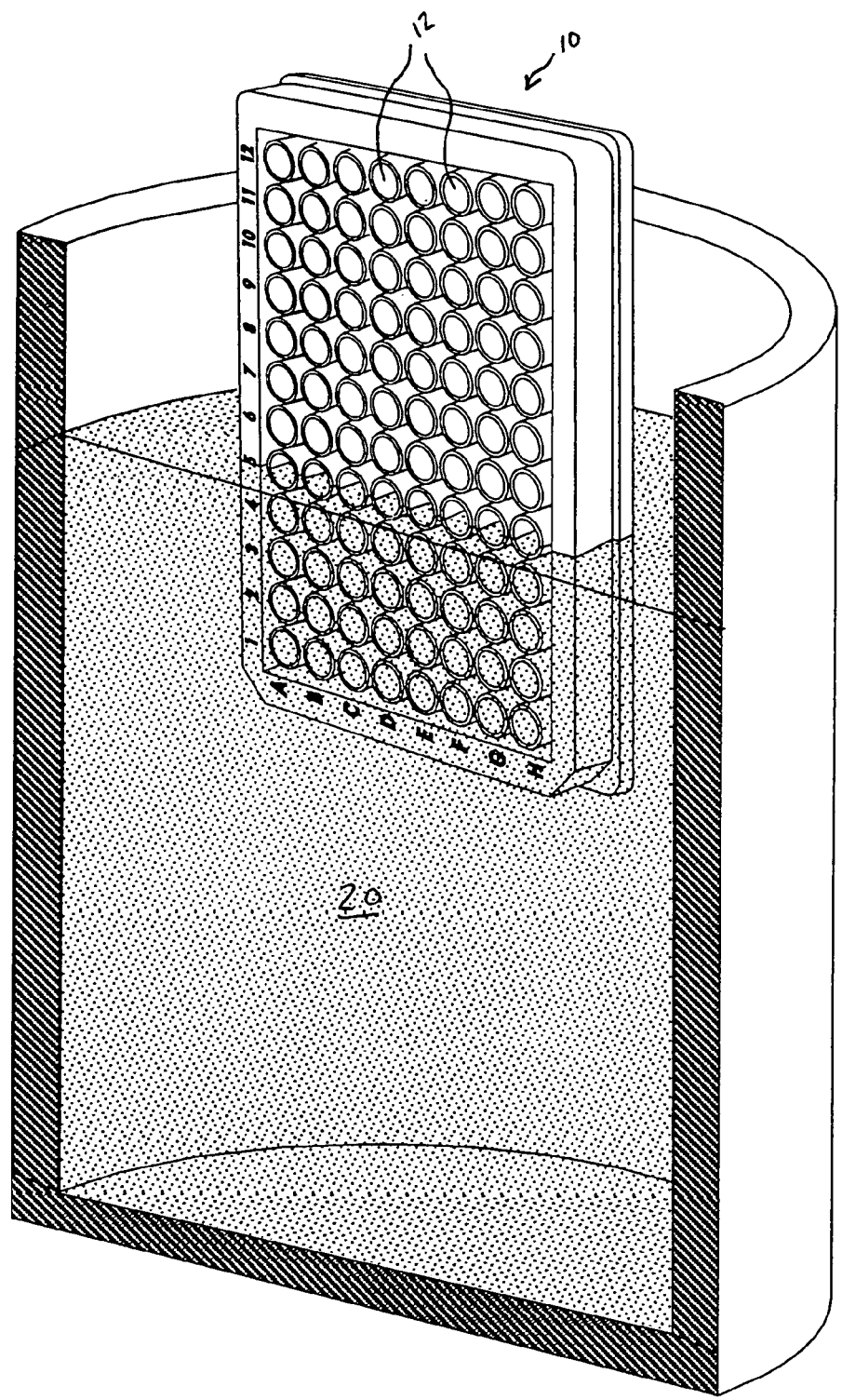
FIG. 1 is a perspective view of a multi-well plate shown partially immersed in a quenching bath in accordance with the present invention.
Figure 2:
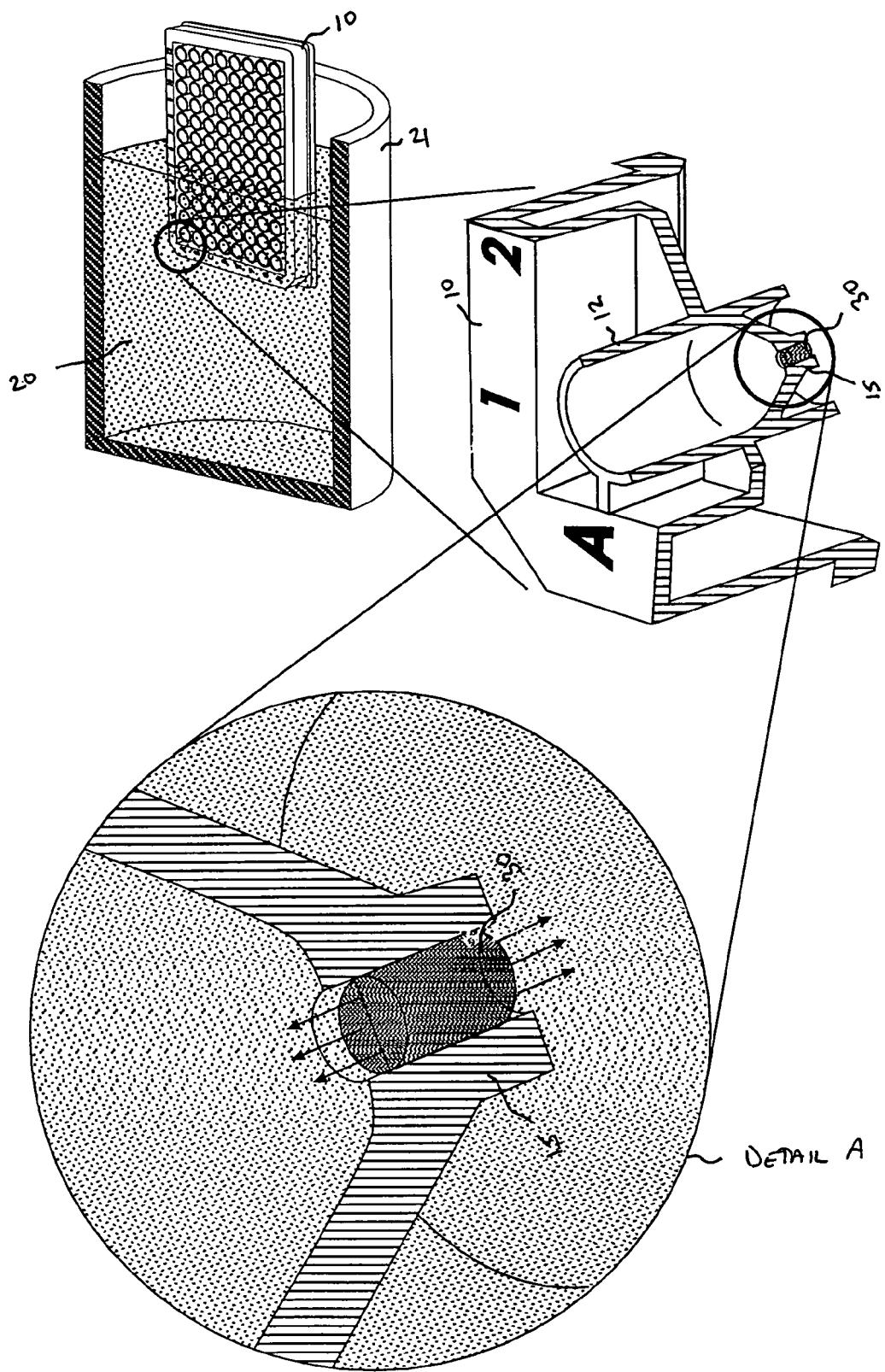
FIG. 2 a perspective view of a single well of a multi-well device, with the composite structure shown in expansion in Detail A.

Turning now to FIGS. 1 and 2, the preferred method of forming the device of the present invention is illustrated with a multi-well plate 10, although those skilled in the art will appreciate that the type and configuration of the housing is not so limited. In this embodiment, the device includes a plurality of wells 12 each in fluid communication with a respective outlet or drainage opening 15, containing a three dimensional membrane structure preferably comprising a plurality of sorptive particles entrapped in a porous polymer matrix so as to form a device capable of carrying out solid phase extraction. Preferably the membrane structure 30 is located at the distal end of the drain 15, and has a volume of about 300 nanoliters. The drain preferably has a small internal diameter, such as about 0.5 millimeters, so that the membrane structure is relatively small and therefore requires less elution volume. In the preferred embodiment where the structure 30 is coterminous with the bottom open end of the drain 15, sample dilution is minimized due to the reduction or absence of deadspace. Those skilled in the art will appreciate that the geometry of the spout or drain can be appropriately configured to design various sample preparation devices, including devices having one or more filled spouts with a membrane layer over the one or more filled spouts.

After the polymer lacquer (with or without particles) is introduced into each well 12 (preferably in a precise, predetermined amount), the plate 10 is exposed to a suitable quench bath 20. The quench bath can be a gas (e.g., water vapor) or a liquid, and in the latter case is contained in a suitable container 21. It is important that care is taken to not entrap air between the liquid quench bath and the lacquer in order to promote good solvent exchange. Preferably the plate 10 is exposed (submerged in the case of a liquid quench) so that quenching begins from both the top and bottom (e.g., drain) of each well simultaneously and isobarically; that is, the quenching is from the outside towards the center of the structure or structures. This can be accomplished by immersing the plate 10 vertically or substantially vertically in the bath as shown in FIG. 1, although those skilled in the art will appreciate that the present invention is not limited to vertical immersion. Since there is no pressure differential driving quenching bath intrusion, solvent exchange is controlled by diffusion. This process is slower and forms a denser composite structure than that formed from a single-sided quench (e.g., quenching through a single opening in the housing). Semi-permeable membranes are also formed on either side of the structure that also act as flow restrictions. The plate 10 preferably remains submerged in the quench bath 20 for a sufficient time to ensure that the polymer has solidified. The particular quench time depends in part on the size of the structure, and can be readily determined by those skilled in the art.

The height and diameter of the composite structure formed is not particularly limited, and depends in part on the geometry of the housing. Exemplary composite structure heights thus formed in typical wells can range from about 1.0 to about 1.5 mm with about 0.5 mm diameters. Deeper wells with composite structure heights from about 4 to about 8 mm with 2.5 mm diameters also are suitable.

Figure 6:
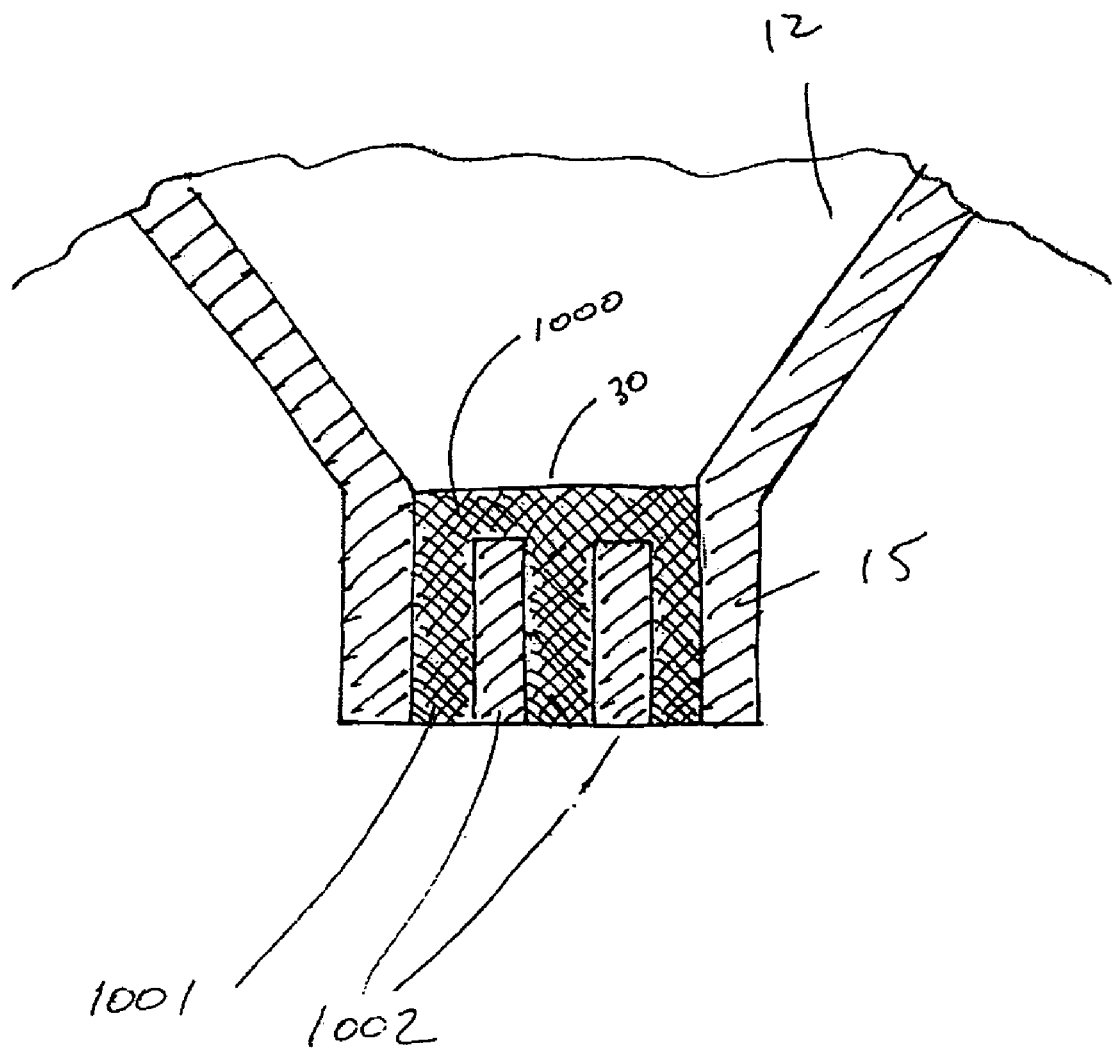
FIG. 6 is a cross-section illustration of a well spout with multiple apertures containing the composite structure.

Those skilled in the art will appreciate that the configuration of the housing that contains the membrane structure formed can be planar, substantially planar, cylindrical, conical, or any other geometry that can contain the membrane structure and allow adequate solvent exchange between the quench bath and the casting solution during formation. The housing configuration can be such that quenching can occur from more than two sides. Preferably the configuration is symmetrical such that quenching occurs uniformly. The inside spout geometries can be square, rectangular, round, oval or other shapes including further membrane supporting elements. In FIG. 6 is shown a well 12 that leads to an outlet, drain or spout 15. Cast in the spout 15 is a three dimensional composite structure 30, which preferably fills and conforms to the inside geometry of the spout 15. Within the spout 15 are shown one or more support elements 1002, which provide additional surface for the composite structure to adhere (particularly by chemical adhesion), thereby reducing the potential of adhesion failures due to the shrinking of the composite structure during the precipitation step. Although two support elements 1002 are shown, those skilled in the art will appreciate that fewer or more support elements can be used. In addition, the shape and size of the support elements 1002 is not particularly limited, although suitable shapes and sizes should be chosen so as to not interfere with the function of the membrane formed. Where multiple support elements are used, each need not have the same size and shape as the others. Preferably the support elements 1002 are vertical columns that extend from the bottom of the drain 15 as shown. The upper portion 1000 of the composite structure 30 in this embodiment is shown covering the structural elements 1002 thereby forming a device with a large face area. To support the larger face area small channels 1001 are filled with composite structure. It is understood that the device in this embodiment could be filled so that only the lower portions 1001 of the channels are filled thereby forming a device spout comprising a series of smaller filled apertures.

Suitable housing materials are not particularly limited, and include plastics (such as polyethylene and polypropylene), glass, ceramics and stainless steel. Polyolefins, and particularly polypropylene, are preferred housing materials in view of the chemical adhesion that is created with the composite structure when the composite containing polysulfone, and in particular UDEL P3500 and P1700 polysulfones available from Amoco, or Dow STYRON available from Dow Chemical, is cast-in-place therein.

Suitable quench baths include water, alcohol, mixtures of water and alcohol, mixtures of water and non-solvents, air and humidified air.

The system for casting individual membrane structures requires several components. The first is a housing composed preferably of polypropylene containing an array of small orifices (spouts). An example of such a housing is the underdrain of a Multiscreen® Plate commercially available from Millipore Corporation which contains 96 spouts with an internal diameter 0.018" spaced at 9 millimeters apart. The second component is the membrane lacquer containing the media of interest. A typical lacquer with C18 silica media consists of 10 g of polystyrene polymer (Dow STYRON 685D) and 65 g N-Methyl-2-Pyrollidone. These components are mixed on a roller mill until the solution is homogeneous. Then into this mixture 25 g of C18-200-15 spherical silica (Millipore) is added and the solution is again mixed to homogeneity.

Although precise dispensing of a predetermined amount of lacquer into the array can be performed manually, it is much more convenient to use an X-Y-Z robotic device such as a DCI-Astra-Meridian Dispenser (Franklin, Mass.). This is an X-Y-Z gantry-type robot that has a small gauge needle attached to a pressurized reservoir. The position of the needle is microprocessor controlled. The casting process is started by firmly affixing the housing to the deck of this apparatus and adding the lacquer to the reservoir. The needle is then purged of air and the microprocessor initiates a program that locates the needle within each orifice for approximately 1 second, while dispensing about 0.5 nanoliters of lacquer. Preferably, the entire instrument should be placed in a dehumidified room to prevent premature lacquer precipitation. Once all the orifices have been filled, the plate is removed from the apparatus and inserted vertically into a quench bath of 20% v/v isopropanol (in deionized water) to a depth that covers all the lacquer filled orifices. The plate is gently agitated to release any trapped air-bubbles and allowed to sit for 2 minute at room temperature. After this period, it is removed and re-immersed into a DIW bath at room temperature for one hour. The housing is then removed and dried in an oven overnight at 60° C.

The aforementioned membrane structure formation process produces a membrane structure that is more dense (more binding sites per unit volume) than structures produced by single-sided quenching. Additionally, the two-sided quench with an alcohol/water system yields a structure that readily flows under vacuum without the need to cut the quench ends as is necessary with a single-sided quench. The benefit of increased density is that sample capture is much more efficient relative to the open structure produced by the single side quench and cut method as more binding sites are available per unit volume. The differentiation between structures is most pronounced with shorter residence times and dilute solute concentrations. That is, for a given residence time, the denser structure effectively captures more dilute sample which subsequently translates to a lower level of detection by mass spectrometry or other means.

Figure 3:
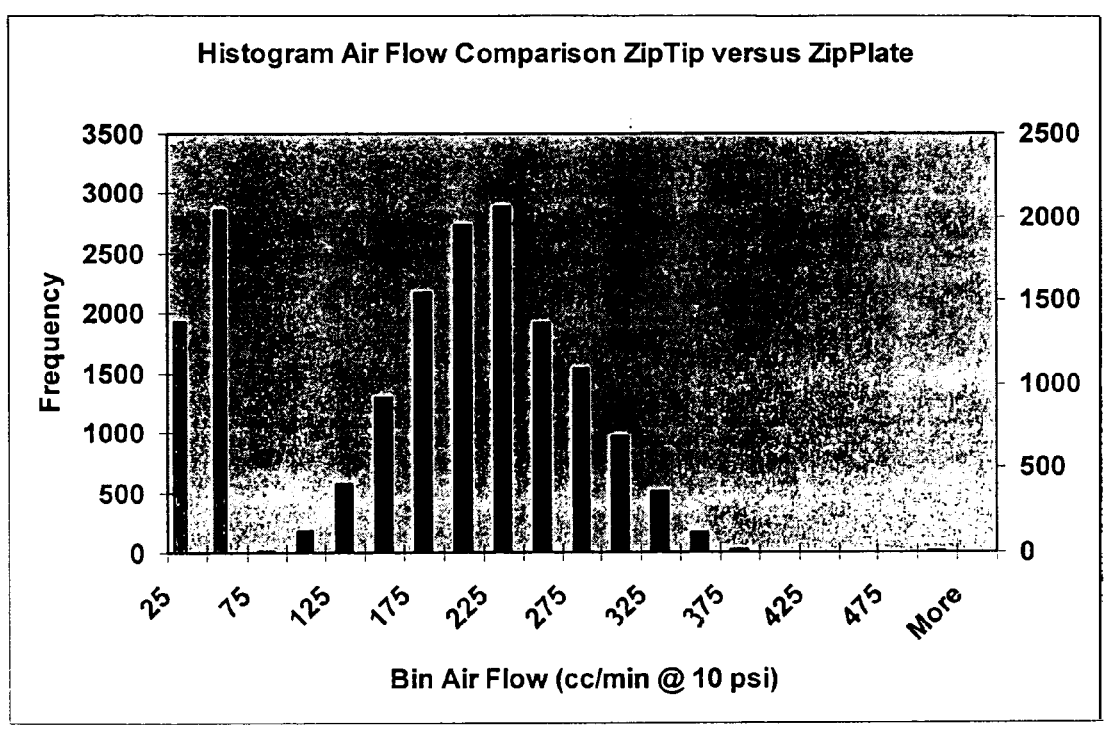
FIG. 3 is a graph comparing flow through the device of the present invention with a conventional device.

FIG. 3 shows a comparison of airflow between the multi-well composite membrane array formed by the multi-sided quench in accordance with the present invention and a pipette made in accordance with the prior art wherein a single-side quench and cut method was used. The denser, less permeable structure of the present invention is easily identified by airflow data. The range of airflow from over 5000 tests was of less than 100 cc/min (when adjusted for the cross-sectional area, 100 cc/min equals 51 liters/min/$cm^2$), generally from about 5-75 cc/minute at 10 psi, with an average of about 45 cc/minute. In contrast, the single sided quench and cut resulted in an airflow of greater than 100 cc/min at 10 psi, and averages about 230 cc/min (the membrane diameters of both structures are about 0.5 millimeters). Although the denser structure of the present invention flows much more slowly than the single-side quench and cut structure, due to the higher density of adsorptive particles and the longer resulting residence times, solute capture is more efficient and can occur in a single pass. This enables the structure to be effective in vacuum driven devices (5 inches Hg has been found to be suitable) where only one pass is possible. In contrast, the relatively "open" structure of the prior art has relatively low flow resistance and thus the density of adsorptive particles is also lower. As a result, solute adsorption is less efficient and in many cases, the sample must be passed through the structure multiple times for efficient adsorption. This is accomplished easily with a hand-held pipettor.

Figure 4A:
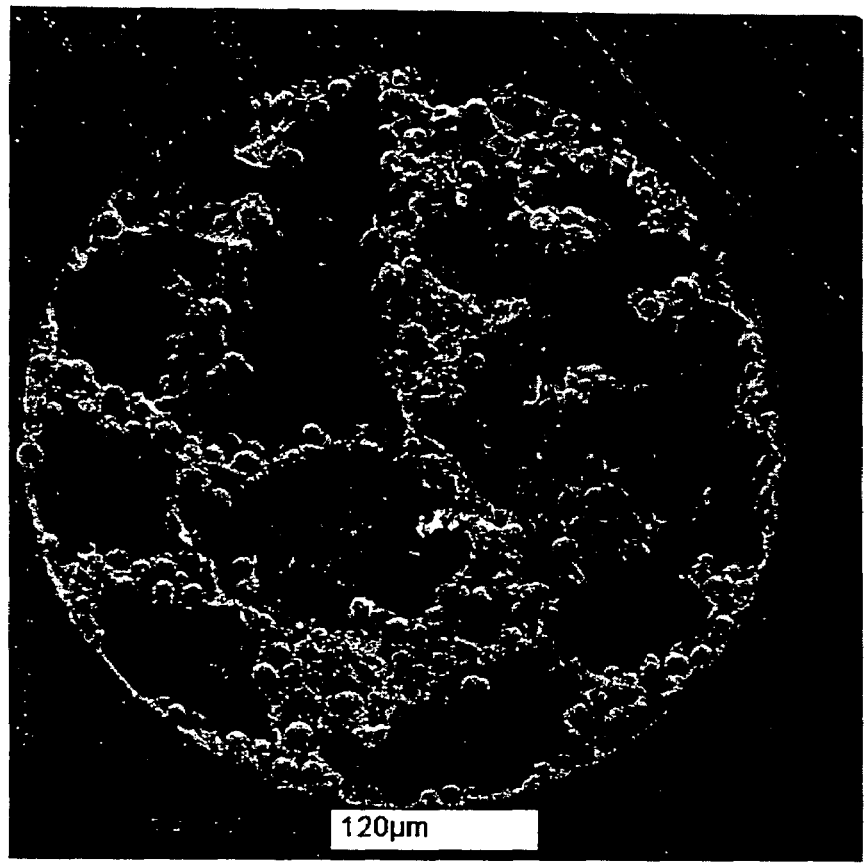
FIG. 4A is an SEM of the cross-section of a composite structure with particles having nominal diameters of 15 micrometers formed in accordance with the prior art.
Figure 4B:
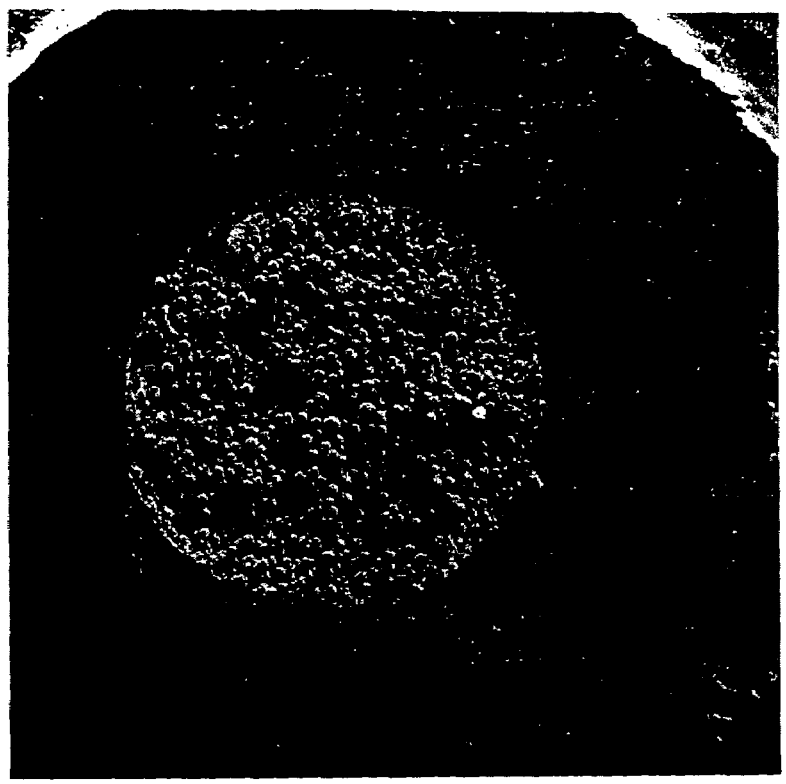
FIG. 4B is an SEM of the cross-section of a composite structure with particles having nominal diameters of 15 micrometers formed in accordance with the present invention.

This density difference can be seen with reference to FIGS. 4A and 4B. FIG. 4A is an SEM of a composite structure formed by a single-sided quench and cut, and FIG. 4B is an SEM of a composite structure formed by a double-sided quench. FIG. 4B shows a much more dense structure than FIG. 4A.

While the invention has been discussed in relation to the embodiment using a multi-well plate, the same invention can be formed in a single well device, such as a pipette tip. One can obtain a structure according to the present invention by casting a lacquer into a pipette tip and, rather than precipitating the structure by drawing fluid into only the bottom of the tip, as is taught by the prior art, one inserts the tip into a bath such that fluid enters both ends of the tip and precipitates the structure of the present invention.

EXAMPLE

Figure 5A:
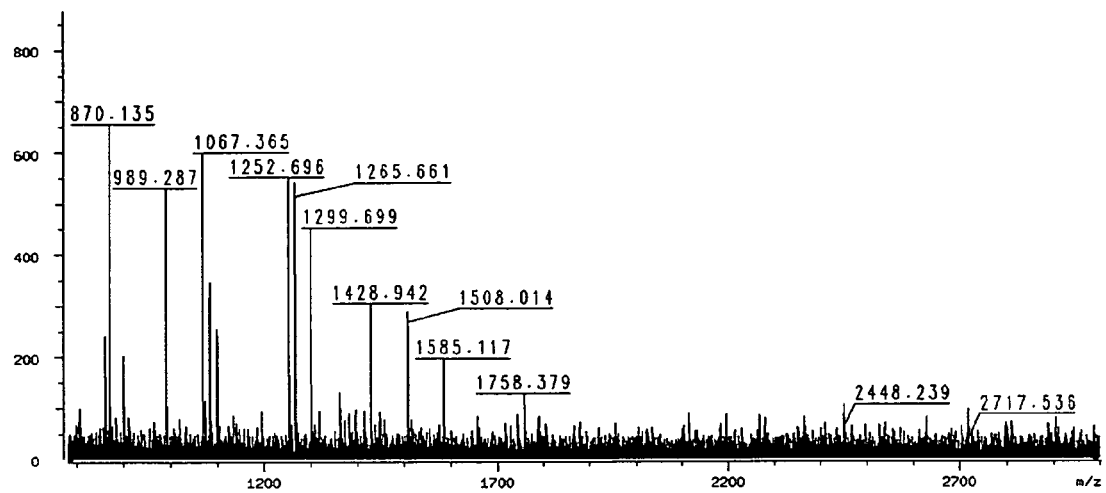
FIG. 5A is a spectrum of a sample subjected to a single-pass through the device of the present invention.

A 100 µl sample containing 50 fmol of *E. Coli* β-galactosidase (B-gal) tryptic peptides was loaded onto a dense composite C18 membrane of the present invention (formed by a two-sided quench) in a single pass using 5 inches Hg of vacuum. The bound peptides were washed with 100 µl of 0.1% (v/v) Trifluoroacetic acid again using vacuum. The peptides were then eluted in 1.5 µl of 50% acetonitrile in DIW containing 10 mg/ml of α-cyano-4-hydroxy-cynnamic acid. The eluant was then spotted onto a MALDI TOF MS target and analyzed by a Bruker Daltronics AutoFlex MALDI TOF MS. Ten peptides were positively identified by data base search as shown in FIG. 5A.

Figure 5B:
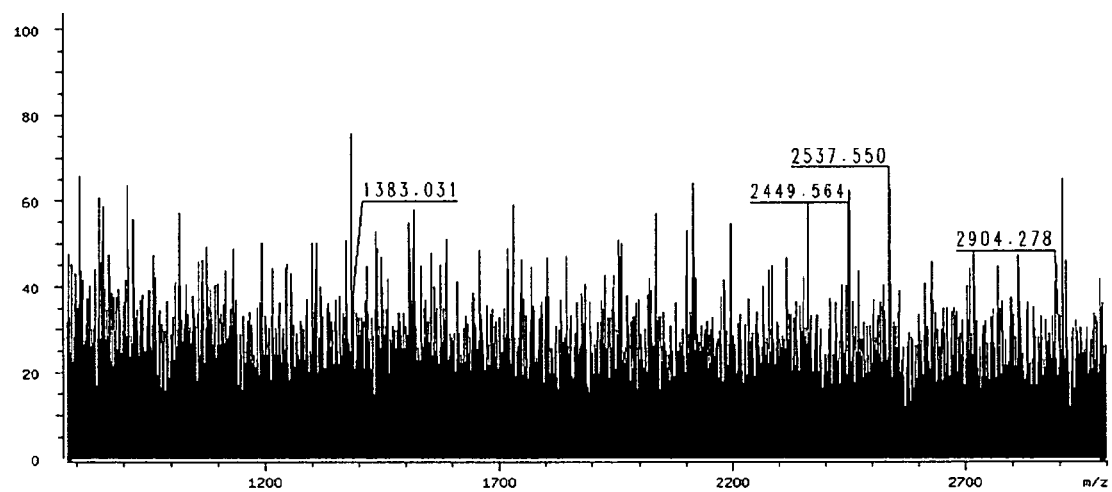
FIG. 5B is a spectrum of a sample subjected to a single-pass through the device of the prior art.

A 100 µl sample containing 50 fmol of *E. Coli* β-galactosidase (B-gal) tryptic peptides was loaded onto a conventional porous composite C18 membrane (formed by a single-sided quench and cut method) in a single pass using a Gilson P200 Pipetman. The bound peptides were washed with 100 µl of 0.1% (v/v) Trifluoroacetic acid again using the Pipetman. The peptides were then eluted with 1.5 µl of 50% acetonitrile in DIW containing 10 mg/ml of α-cyano-4-hydroxy-cynnamic acid. The eluant was then spotted onto a MALDI TOF MS target and analyzed by a Bruker Daltronics AutoFlex MALDI TOF MS. No peptides were positively identified by data base search, as shown in FIG. 5B.

Clearly, for single pass, vacuum driven, automation-friendly application, the structure created by a two-sided formation (uncut) method yielded excellent mass spectra.

What is claimed is:

1. A method of forming a structure in a housing, comprising:
   providing said housing having at least first and second openings, said first opening being spaced from said second opening and being in fluid communication with each other;
   dispensing into said housing a predetermined amount of casting solution comprising a membrane-forming polymer;
   exposing said casting solution to a quenching bath in which said polymer is insoluble so as to cause said quenching bath to enter each of said openings simultaneously in order to precipitate said polymer in said housing; wherein said precipitated polymer has an aspect ratio of less than about 10.

2. The method of claim 1, further comprising providing a plurality of sorptive particles in said porous polymer.

3. The method of claim 1, wherein said quenching bath enters each of said openings isobarically.

4. The method of claim 1, wherein said quenching bath comprises alcohol and water.

5. The method of claim 1, wherein said quenching bath is a gas.

6. The method of claim 1, wherein said housing is a drain of a well of a multi-well plate.

7. A method of forming a structure in a housing, comprising:
   providing said housing having a plurality of wells, each of said wells having a drain having an inlet and an outlet;
   introducing into each said drain a predetermined amount of casting solution comprising a membrane-forming polymer;
   exposing said casting solution to a quenching bath in which said polymer is insoluble by causing said quenching bath to enter both said inlet and said outlet of each said drain isobarically and simultaneously in order to precipitate said polymer in each said drain;

wherein said precipitated polymer has an aspect ratio of less than about 10.

8. The method of claim 7, wherein said casting solution comprises sorptive particles.

9. The method of claim 7, wherein said quenching bath enters said inlet and outlet isobarically.

10. The method of claim 7, wherein said quenching bath comprises alcohol and water.

11. The method of claim 7, wherein said quenching bath is a gas.

* * * * *